United States Patent [19]
Allen et al.

[11] 3,762,434
[45] Oct. 2, 1973

[54] PILOT OPERATED BELLEVILLE RELIEF VALVE

[75] Inventors: Thomas E. Allen, Mustang, Okla.;
James L. Schmitt, Washington, Ill.

[73] Assignee: Caterpillar Tractor Co., Peoria, Ill.

[22] Filed: July 14, 1972

[21] Appl. No.: 271,791

[52] U.S. Cl. .................................... 137/489, 137/491
[51] Int. Cl. ...................... F16k 31/12, F16k 31/36
[58] Field of Search................. 137/491, 489, 489.5, 137/492.5, 625.66; 251/65

[56] References Cited
UNITED STATES PATENTS
3,442,290  5/1969  Phillips ..................... 137/625.66 X
3,454,039  7/1969  Dunkelis............................ 137/491

*Primary Examiner*—Henry T. Klinksiek
*Assistant Examiner*—Robert J. Miller
*Attorney*—Freling E. Baker et al.

[57] ABSTRACT

A pilot-operated Belleville relief valve comprises a plurality of conically shaped spring washers arranged in a bore of a housing against an annular valve member exposed to flow from an inlet, a control chamber defined by the washers and valve member, and an orifice in the valve member communicating with the control chamber to provide a pressure differential which opens a primary relief outlet path from the relief valve, and a pilot relief valve in fluid communication with the control chamber and responsive to a predetermined pressure to control the valve member to provide a substantially linear pressure relief for a broad flow range.

16 Claims, 3 Drawing Figures

PATENTED OCT 2 1973　　　　　　　　　　　　　3,762,434
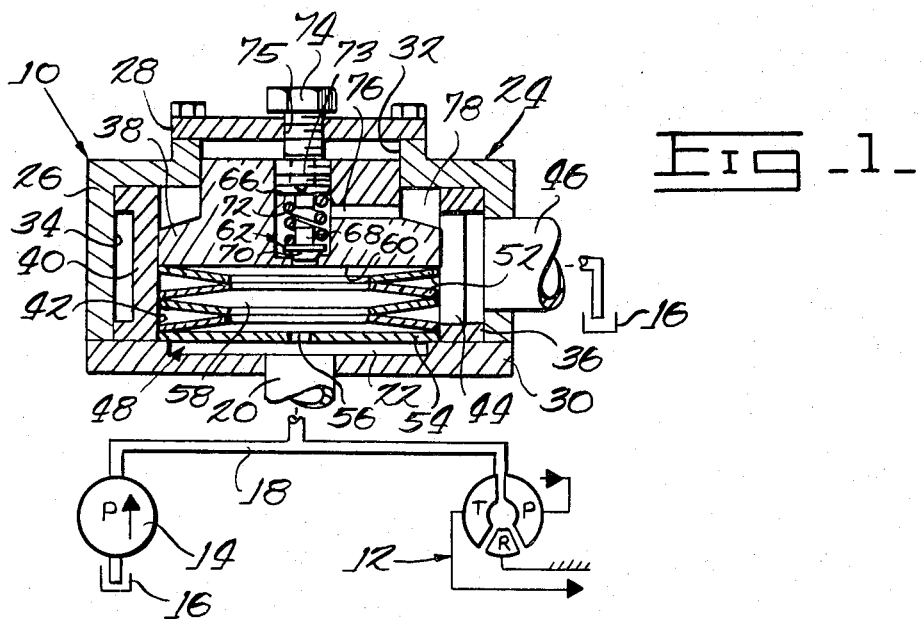
Fig-1-
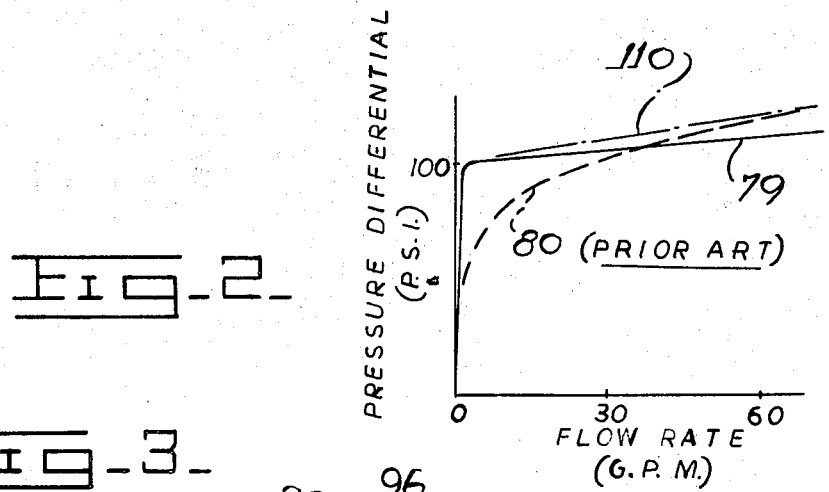
Fig-2-
Fig-3-
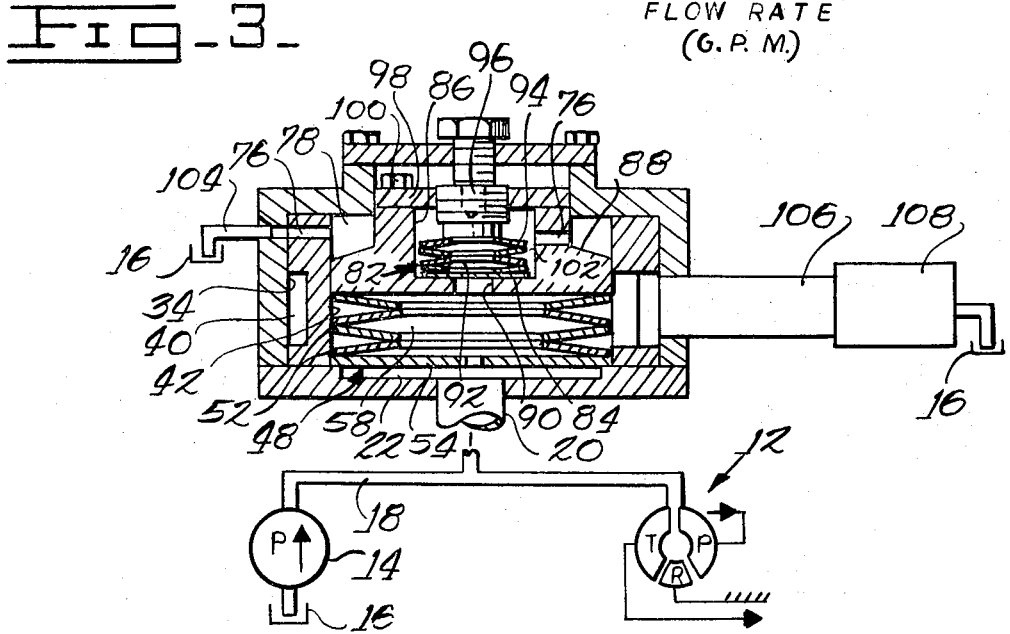

PILOT OPERATED BELLEVILLE RELIEF VALVE

BACKGROUND OF THE INVENTION

The present invention is an improvement over arrangements of the type disclosed in U.S. Pat. application Ser. No. 163,594, now U.S. Pat. No. 3,717,167, entitled "Flow Limiter and Relief Valve-Belleville Washer," of Thomas E. Allen, filed on July 19, 1971, and assigned to the assignee of the present invention.

Conventional methods of regulating and relieving fluids usually include coil spring biased spool valves which are complex and expensive to manufacture. Such spools are subject to sticking within their associated housing bores because of close diametrical tolerances, and their length often consumes valuable axial space. Further, such spool valves are frequently overly sensitive in some respects to rates of flow and tend to be subject to hunting and rate-of-response problems.

Examples of the prior art are shown in U.S. Pat. No. 3,180,355, issued April 27, 1965 to Long; and U.S. Pat. No. 3,442,290, issued May 6, 1969 to Phillips.

SUMMARY OF THE INVENTION

In view of the above noted problems, it is a primary object of the invention to provide a pilot-operated pressure control relief valve which is compact, reliable and inexpensive.

Another object of the invention is to provide an axially compact pressure relief valve that is substantially instantaneous in operation and is not subject to sticking or hunting.

In accordance with a primary aspect of the invention, there is provided a pilot operated pressure control relief valve operative to provide substantially linear pressure relief for a broad range of fluid flow rates. The pressure relief valve comprises a series arrangement of Belleville spring washers defining a control chamber in combination with a disc valve element and a pilot valve responsive to pressure in the control chamber to control opening of the relief valve.

Other objects and advantages of the present invention will become more readily apparent upon reference to the accompanying drawings and following description.

BRIEF DESCRIPTION OF THE DRAWINGS

FIG. 1 is an elevational view in section of a preferred embodiment of the present invention, shown in a schematic illustration of the inlet circuit of hydraulic torque converter;

FIG. 2 is a graph showing a characteristic performance curves of pressure differential (psi) versus flow rate (gpm) for the preferred embodiment of the present invention, for the second embodiment thereof, and for typical prior art relief valves; and, FIG. 3 is a view in section of an alternate embodiment of the present invention.

DESCRIPTION OF THE PREFERRED EMBODIMENT

Referring now to the drawings, there is illustrated in FIG. 1 a pilot-operated Belleville relief valve 10, specifically adapted to the fluid inlet circuit of a hydraulic torque converter 12. A hydraulic pump 14 delivers charging fluid from a reservoir or sump 16 to an inlet conduit 18 of the torque converter in a well-known manner. A branch conduit 20 leads from the inlet conduit to an inlet chamber 22 within a housing 24 of the pilot-operated Belleville relief valve. The housing, including a central portion 26 and a pair of oppositely disposed end plates 28 and 30, contains a pair of concentric cylindrical bores 32 and 34 which accommodate therein a cylindrical sleeve 36 and an adjustable but normally fixed piston 38. The sleeve has an outer annulus 40 which is in communication with an inner cylindrical bore 42 of the sleeve through a plurality of radially extending passages 44. An outlet or return conduit 46 returns fluid from the pilot-operated relief valve back to the sump 16.

More particularly, the pilot-operated Belleville relief valve 10 includes a primary pressure relief valve 48 having a plurality of conically-shaped spring washers 52 arranged in series between the piston 38 and a circular fluid valve member or plate 54 within inner bore 42 of the sleeve 36. Such conically-shaped spring washers are well known in the art as Belleville washers. The plate has an orifice 56 centrally formed therein to permit a predetermined limited flow of fluid from the inlet chamber 22 to a central pressure control chamber 58. The central pressure control chamber 58 is defined by a lower face 60 of the piston, the washers, and the plate itself. The series-arranged washers are alternately in sealing engagement at their outer diameters and at their inner diameters, and thereby form a barrier substantially preventing flow of fluid from the central chamber to the outlet conduit 46.

The pilot-operated Belleville relief valve 10 further includes a pilot relief valve 62 disposed within a bore 66 of piston 38, and contains a tapered plunger 68 exposed to pressure in the central control chamber 58 and urged against a seat 70 in the piston by a coiled spring 72. The upper end of the coiled spring is in contact with the lower face of an Allen head screw 73 threadably disposed in the bore. An external adjusting bolt 74 is in contact with the upper face of the Allen head screw, and extends inwardly through a threaded bore 75 in the end plate 28 for initially positioning the piston within the housing 24. A radially disposed passage 76 in the piston communicates the bore 66 with an annular chamber 78 defined by the bore 42 of the sleeve, the outer periphery of the piston, and the central portion 26 of the housing. Chamber 78 is, in turn, open to the radial passages 44 and to the outlet conduit 46.

The preferred embodiment of the present invention provides a characteristic performance curve of pressure differential (psi) versus the flow rate (gpm), as shown by a solid line trace 79 in the graph of FIG. 2. This trace compares very favorably with typical prior art relief valves having a performance characteristic similar to a broken line trace 80.

DESCRIPTION OF A SECOND EMBODIMENT

FIG. 3 shows a second embodiment of the pilot-operated Belleville relief valve, and containing a primary pressure relief valve 48 which is identical to valve 48 described above with respect to the preferred embodiment, and a pilot relief valve 82 of differing construction. Pilot relief valve 82 includes a barrier plate 84 disposed in a cylindrical vertical bore 86 in a piston 88. In the position shown, the plate blocks the end of a vertical passage 90 within the piston, which is open to the chamber 58. The plate is biased downwardly against a seat 92 by a plurality of conically-shaped spring washers 94, also disposed within the bore 86. These washers are loadably held in place by an Allen head screw 96 threadably disposed in a cover plate 98 securable to the piston 88 by a plurality of bolts 100. A plurality of radially extending but vertically oriented relief cavities 102 communicate with the passage 76 and the annular chamber 78. However, the chamber 78 relieves to the reservoir 16 through an outlet conduit 104 independent of an outlet conduit 106 communicating with the primary pressure relief valve 48. The outlet conduit 106 communicates with a device 108 prior to communication with the reservoir, which utilizes any flow relieving through the primary pressure relief valve.

If the device 108 does not provide a back pressure in the outlet conduit 106 when primary pressure relief valve 48 is relieving, then the characteristic performance curve is shown by the solid line trace 79 in the graph of FIG. 2 as mentioned above. However, when the device 108 provides a back pressure in outlet conduit 106, the characteristic performance curve of the second embodiment is to be noted by phantom line trace 110.

OPERATION

While the operation of the present invention is believed apparent from the foregoing description, further amplification will be made in the following summary.

In operation, and with reference to FIG. 1, fluid flows to the component requiring pressure regulation such as the torque converter 12 and to inlet chamber 22. The size of orifice 56 is small in comparison to the outside diameter of plate 54 so that the pressure differential between chambers 22 and 58 has its maximum effect on the load of washers 52. The pilot relief valve 62 is adjusted to relieve fluid along a secondary outlet path from the chamber 58 to the outlet conduit 46 via passage 76, and by unseating of the plunger 68 at an initial setting slightly below the pressure differential required to open the primary pressure relief valve 48. The pilot relief valve functions to hold the differential pressure across valve 48 substantially constant, as shown by the generally horizontally disposed solid line trace 79 on the graph in FIG. 2. Trace 79 is nearly flat and linear, even at low flow rates, and this characteristic is more easily appreciated as being highly desirable when compared with the performance capabilities of many conventional pressure relief valves as typified by broken line trace 80 shown in the graph. Note that the prior art relief valves do not maintain a constant pressure drop throughout a broad flow rate range.

Plate 54 in FIG. 1 will remain on its seat at low fluid flow rates across orifice 56 since the pilot relief valve 62 can handle such low flow at its initial pressure setting. Use of the pilot relief valve also permits lighter initial spring loads in the main valve. However, when a predetermined pressure differential is reached across plate 54, for example 100 psi, plate 54 is forced upwardly against the load of the washers 52 until fluid in chamber 22 is allowed to escape along a primary outlet path directly to the radial passages 44. Plate 54 will remain in a throttling or metering condition to maintain the predetermined pressure differential. Under these conditions, it is not intended that fluid be relieved through either the contiguous faces of the inner or outer diameters of washers 52, but if some leakage does occur, it would be relatively insignificant and would still return to sump 16.

In the second embodiment of the pilot-operated Belleville relief valve shown in FIG. 3, pilot relief valve 82 provides the same function as previously described pilot relief valve 62 of the preferred embodiment, by relieving pressure in chamber 58 to sump 16. However, while pilot relief valve 82 relieves to the sump directly along a secondary outlet path, primary pressure relief valve 48 relieves indirectly along a primary outlet path to the sump through a back pressure device 108 in this second embodiment. Device 108 provides a back pressure in the outlet conduit 106 when the primary relief valve 48 is in its fluid-relieving mode of operation. Under this condition, valve 48 will function as a substantially constant but slightly increasing proportional pressure differential valve, as shown by the phantom line pressure trace 110 in the graph of FIG. 2.

A snap action response can be achieved from the main relief valve of the present construction by constructing it so that the area of pressure acting on the inlet side of member 54 is greater than that acting on the control chamber side. This can be achieved by making diameter of the inlet chamber 22 significantly smaller than the diameter of the bore 42. Such an arrangement would result in the fluid pressure in control chamber 58 assisting in keeping valve member 54 seated in closed position until the pilot valve 62 or 82 opens. Upon movement of valve member 54 away from its seat, the area subject to pressure on the inlet side would suddenly increase, resulting in a sharp increase in force tending to force the valve open.

From the above description, it is readily apparent that there is disclosed a pilot-operated Belleville relief valve in accordance with the present invention comprising a novel combination of a pilot-operated relief valve and primary pressure relief valve using an orificed plate and plurality of biasing conically-shaped spring washers arranged in series that is operative to achieve the objectives of the present invention. The present invention provides a compact relief valve which provides a substantially linear performance for a broad flow range. It is substantially instantaneous in operation, not subject to sticking or hunting, and is relatively economical to manufacture.

While the invention has been described and shown with reference to preferred embodiments, it is apparent that variations are possible that would fall within the scope of the present invention, which is not intended to be limited, except as defined in the following claims.

We claim:
1. A pilot-operated Belleville relief valve, comprising:
   a housing having a chamber formed therein and including inlet and outlet openings communicating with said chamber,
   valve means comprising a disc member and a plurality of Belleville washers disposed in said bore and operative to control fluid flow between said inlet and said outlet openings,
   a source of pressurized fluid communicating with said inlet opening,
   a control chamber defined by said Belleville washers and said disc member in fluid communication with said source through an orifice formed in said disc,
   said valve means being responsive to a predetermined differential pressure across said orifice to permit communication between said inlet and said outlet, and a pilot relief valve in fluid communication with said control chamber for limiting the pressure therein.

2. The pilot-operated Belleville relief valve of claim 1 wherein said Belleville washers are arranged in series so that their outer diameters and inner diameters are in sealing engagement.

3. The pilot-operated Belleville relief valve of claim 1 including adjustable means for establishing a predetermined loading of said washers against said disc member for modifying said predetermined pressure at which said valve opens.

4. The pilot-operated Belleville relief valve of claim 3 wherein said chamber comprises a cylindrical bore; and said adjustable means is an adjustable piston disposed in said bore.

5. The pilot-operated Belleville relief valve of claim 1 wherein said pilot relief valve comprises a valve member and spring means biasing said valve member against the pressure in said control chamber.

6. The pilot-operated Belleville relief valve of claim 5 wherein said valve member is a tapered plunger and said spring means is a coiled spring.

7. The pilot-operated Belleville relief valve of claim 5 wherein said spring means is a plurality of conically-shaped spring washers.

8. A pilot-operated relief valve, comprising:
a housing defining a chamber and having inlet and outlet openings communicating therewith,
a valve member disposed in said chamber and having an orifice formed therein,
a source of pressurized fluid communicating with said inlet opening of said housing,
a plurality of conically-shaped spring washers disposed in said bore and urging said valve against said pressurized source to prevent opening of said valve and communication between said inlet and said outlet openings below a predetermined value of pressure,
a control chamber defined by said washers in fluid communication with said source by way of said orifice, and
a pilot relief valve in fluid communication with said control chamber for limiting the pressure therein.

9. The pilot-operated relief valve of claim 8 wherein said spring washers are arranged in series so that their outer diameters and inner diameters are in sealing engagement.

10. The pilot-operated relief valve of claim 8 including means for adjustably establishing a predetermined loading of said spring washers against said valve member for modifying said predetermined value at which said valve opens.

11. The pilot-operated relief valve of claim 10 wherein said housing includes a cylindrical bore defining said chamber, and
said adjustment means comprises an adjustable piston disposed in said bore.

12. The pilot-operated relief valve of claim 8 wherein said pilot relief valve comprises a pilot valve member and spring means biasing said pilot valve member against the pressure in said chamber.

13. The pilot-operated relief valve of claim 12 wherein said pilot valve member is a tapered plunger and said spring means is a coiled spring.

14. The pilot-operated relief valve of claim 12 wherein said pilot valve member is a plate and said spring means is a plurality of conically-shaped spring washers.

15. The pilot-operated relief valve of claim 1 comprising an inlet chamber communicating said pressurized fluid to the inlet side of said disc member, said disc having a greater area exposed to said fluid in said control chamber than in said inlet chamber so that said pressurized fluid assists in maintaining said valve closed.

16. The pilot-operated relief valve of claim 8 comprising an inlet chamber communicating said pressurized fluid to the inlet side of said valve member, said valve having a greater area exposed to said fluid in said control chamber than in said inlet chamber so that said pressurized fluid assists in maintaining said valve closed.

* * * * *